Nov. 23, 1937.  H. F. JOHNSON  2,100,217
PRINTER'S GAUGE
Filed March 11, 1937
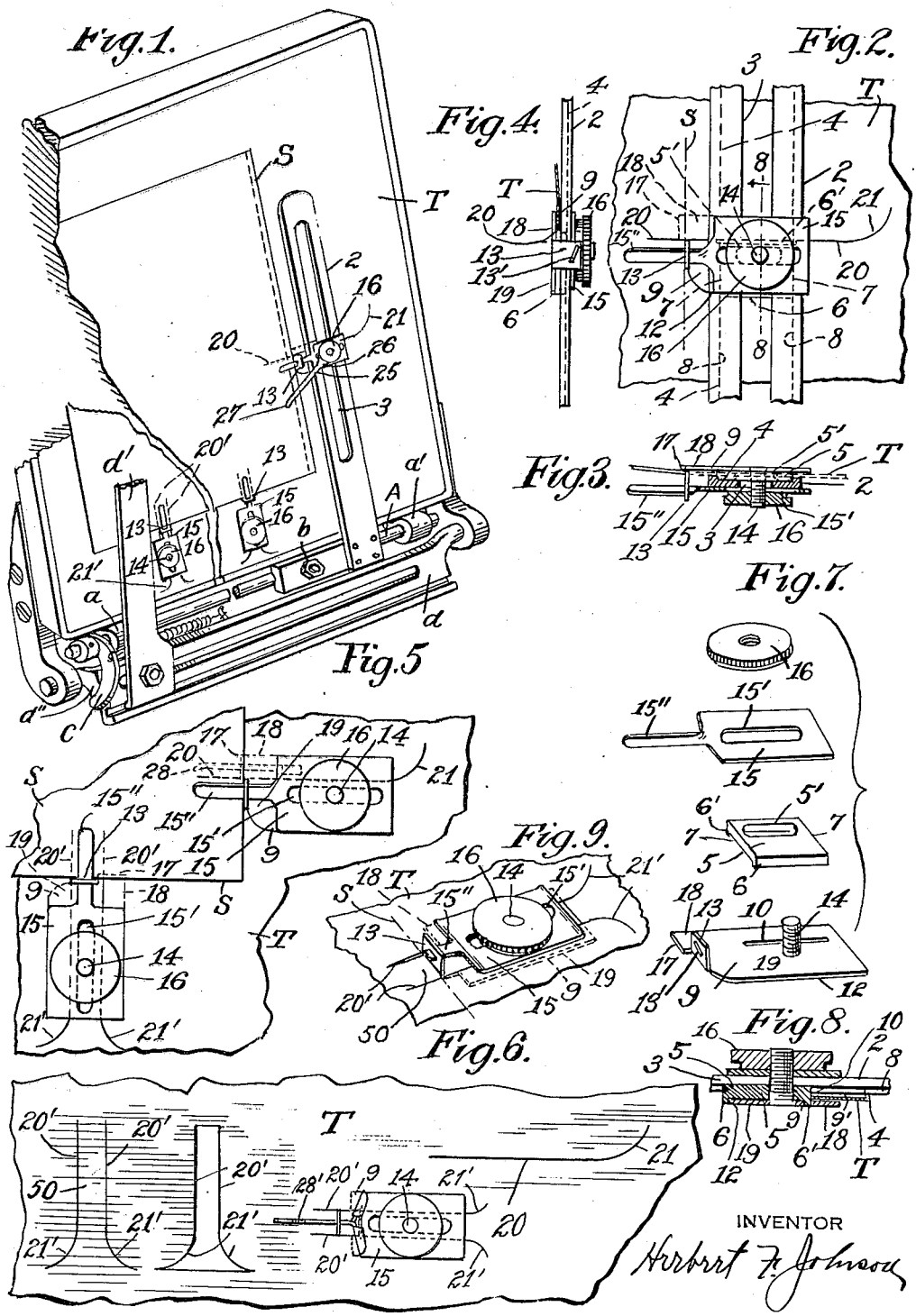
INVENTOR
Herbert F. Johnson Patented Nov. 23, 1937

2,100,217

UNITED STATES PATENT OFFICE 2,100,217

PRINTER'S GAUGE

Herbert F. Johnson, Pittsfield, Mass.

Application March 11, 1937, Serial No. 130,341

8 Claims. (Cl. 101—415)

This invention relates to printers' gauges, such as are used to register sheets to be printed with respect to the type matter or form set up in the printing press, and has to do more particularly with a gauge adapted for use as a side gauge, that may be directly attached to the tympan sheet, and by the addition of an intermediate member may be attached to an arm supported on a shaft of the press, that has imparted thereto a sliding action, transmitted to the shaft by the usual rocking frame, on which the gripper fingers are carried, to open and close the same, and by this means the gauge is shifted with the arm to automatically move the gauge during the closing action of the grippers, and shift the sheet to final register position.

The gauge as here constructed is closely related to the gauge disclosed in my pending application, Serial No. 66,800, filed Mar. 3, 1936.

It is an object of the present invention to provide a gauge embodying such features to enable the gauge for use more particularly as a side gauge, that may be directly applied to the tympan sheet, in which case the gauge takes a fixed position after adjustment thereof, or the gauge may be applied to an arm, on which it is adjustable and that as stated, gives the gauge a slight endwise movement on the tympan, to engage the sheet to be registered in a final registering position thereof, correcting by this means the inability of the operator in uniformly feeding the sheets, or when fed automatically to exact position against the gauge to keep up with the usual speed of the press, by the use of this movable gauge, the speed of the press may be materially increased.

Another object resides in the manner, in which the tympan sheet is slitted to enable the insertion of the gauge, and provide a closed stop by side portions of the gauge base that takes a position under the tympan sheet, thereby raising the slit portions above the base and above the bottom of the stop, preventing sheets being pushed under the stop.

Another object is the provision of means for adjustment of the gauge on the arm, in transverse directions.

A still further object, is the provision of means to form a contact connection of the arm with the tympan sheet to retain the arm in close relation with the sheet, yet permit the endwise shifting thereof.

Other objects with the foregoing will appear as this description proceeds, and will be more particularly pointed out and claimed in connection with the accompanying drawing, in which, Fig. 1 is a perspective view of a printing press platen, with the usual gripper fingers shown mounted on a rocking frame, and a sliding shaft carrying an arm for supporting my improved adjustable gauge, and further shows how the connection is made to hold the arm in close sliding contact with the platen.

Figs. 2, 3, and 4, show respectively, plan, side, and end views, the end view of which, shown partly in section, these views show the gauge attached to the arm.

Fig. 5 shows, as an example two gauges as applied directly to the tympan sheet, one as a side gauge, and one as a bottom gauge.

Fig. 6 is a view of a portion of the tympan sheet, to show how the same may be slitted, for the introduction therein of the gauges.

Fig. 7 is a perspective view of the parts of the gauge, shown in separated position, as preferably constructed to form the gauge.

Fig. 8 is a longitudinal section, taken on line 8—8 of Fig. 2, to show the intermediate block on which the gauge is guided for transverse movement on the arm, with space between the arm and base, to show how the same is held to the platen.

Fig. 9 is a view of the gauge, used as a bottom gauge and shows how the tympan sheet closes the bottom of the stop, when slitted as here indicated.

As shown in the drawing, and the direct relation my improved gauge has with the disclosures made in my aforesaid pending application, I provide a gauge adapted for use more particularly as a side gauge, for direct connection to the tympan sheet, but may be carried on an arm that has a lateral movement imparted thereto, and by the introduction of an intermediate member that takes a position between the base of the gauge and the arm, by which adjustment of the gauge on the arm longitudinally and transversely thereof may be made. The arm, see Fig. 1, is mounted on a shaft A supported in bearings a—a' for sliding action, the arm is adjustable along the shaft, and held in position by a suitable clamping bolt b, at one end of the shaft, and at the other end of the shaft is a curved arm c, fixed to the shaft, that engages the side of a rock frame d, on which the gripper fingers d' are attached, one of which is shown. The rocking of this frame opens and closes the gripper fingers, in the well known manner, as the platen is closed this side portion of the frame, indicated at d'' engages the curved arm c and moves the shaft A, in the direction of the sheet to be registered. The arm 2 is always in close contact with the tympan sheet, during the sliding action imparted thereto by the gripper finger frame, by a connection of the gauge in a slit of the tympan sheet, this preventing the shaft A from rocking. The arm 2, constructed of light sheet material, quite thin in cross section, is slotted, as at 3, extending longitudinally thereof, and the arm is recessed each side of the slot to provide a channel 4, for a sliding block 5 to slide in the recessed part, for guiding the same the full length of the slotted part. The block is so constructed to have depending lips 6—6' transversely disposed to the sides 7 of the block that engage the side walls 8 of the recessed channel to act as guide members for the adjustment of the base 9 of the gauge, to enable such adjustment in a direction transverse to the adjustment of the block in the slotted arm lengthwise thereof. The block 5, see Fig. 7 with its depending lips one of which, as 6' engages at one side of the base member 9, in a slotted part thereof, as 10, and the other lip 6 takes a position outside and against the edge 12, of the base. By this means, the base 9 is movable on the block 5 in a direction transverse to the movement of the base and block simultaneously along the length of the slotted arm in the recessed part 4 thereof. The recessed part of the arm is of a depth somewhat less than the thickness of the body of the block 5, so the lips 6—6' extend outside of the recessed part, and when the base is in position thereon is not in close contact with the underside of the arm providing a space 9' with the lips in position to permit sliding and guiding of the base thereon, and locked by a clamping action provided by a threaded stud 14, fixed to the base passing up through the slotted arm, through a slot 5' in the block 5, and slotted top member 15. The slot 5' is of a length to coincide with the width of the slot 3 in the arm, allowing adjustment of the base transversely on the block 5, which is thereby limited to the length of this slot. The arm 2 however may be adjusted on the shaft A, to approximately the proper position, and then the base set to exact position. It will be seen, the lip 6' is close to the slotted part of the block, so the base 9 with the stud 14, which is central of the base, will provide a wide margin of that part of the base at that side with the slotted part 10 to extend free outside, and under the block, to provide the space 9'.

This top member 15 being the hold-down member of the gauge, having a narrow finger portion at the front thereof, and a wide portion rearward thereof in which the slot is formed, for independent adjustment of this member with respect to the base and the gauge stop 13, at the front of the base, through which the narrow finger extends, and clamped by a nut 16. When using the side gauge attached to the arm, as stated, for automatic register, the speed of the press can be materially increased, in doing so however, when the press is automatically fed, or by hand, it has been found, the rapid action of the stop face engaging with the sheet to shift the same to register position, often results in forcing the sheet beyond and forward of the stop, to obviate this condition, a means is provided to yieldingly engage the sheet, applying a friction to prevent this faulty action, and is here shown consisting of a light spring tension member 25, attached in any desirable manner to the gauge, or the arm, to move with the arm, or the spring finger may take the place of the narrow portion of the hold-down member, and apply this tension in a manner not to interfere with the proper feeding of the sheets thereunder. One form of this member is indicated in Fig. 1, as a leaf spring of flat material with an aperture in a wide portion 26 thereof, to engage under the clamping nut 16, to hold the same in any position to which it may be adjusted, with the reduced and curved end 27 in contact with the sheet to be registered, which sheet may be placed under the spring from the side, as readily as though the spring were not there. This tension member further provides a purpose the gripper finger performed, which, as stated, is removed when the gauge is used in connection with the arm. Of course the tension means may be employed without the arm, to steady the sheet on either the side, or bottom gauge, if desired and applied directly to some part of the gauge, such as the base, or to the hold-down member, or may be a part thereof, and used, as indicated by broken lines, at 28, here shown attached to the side gauge at one side thereof to the hold-down member, see Fig. 5, or as shown in Fig. 6, as a separate part fixed to the hold down member to serve both as the hold down finger member, and the tension member, applicable to any part of the sheet as a side or bottom gauge. The base 9, as here shown, has the stop 13, at the front end bent upward which may be arranged in any desirable manner to be at the extreme end of the base, or the base may extend forward of the stop this may be desirable in some instances. In Figs. 1 to 7, inclusive, I show the stop with this extension at one side of the base, as at 17, on a side portion 18 of the base, and the opposite side 19, of the base, at the front end may be removed, so as not to interfere with the stop 13, when using the gauge on the arm. This part 18, when the gauge is applied to the arm 2 as well as the other parts of the base, except where it engages the block 5 is spaced away from the arm to provide a passage for the tympan sheet to lie over the portion 18 of the base along this side thereof, and the edge of the slit of the tympan sheet ride against the side of the block 5 with the full length of that part 18 of the base under the slitted portion, see Fig. 8. When the gauge is used as a side gauge, either directly connected to the tympan sheet, or slidable in the slit as when applied to the arm, the tympan sheet, indicated at T, is lifted above the bottom of the stop 13, to close the bottom of the stop. When the gauge is used as a side gauge the tympan has a single slit made therein, as at 20 and is so positioned to be in line with the base and transverse to the stop 13, and the slit is of a length to extend under the sheet to be registered, and is preferably curved at the other end, as at 21, to permit ready entrance of the gauge by lifting this curved end, and sliding the gauge into position with the side part 18 of the base under the tympan sheet, as will be readily understood. When the gauge is attached to the arm, the arm is held to the platen, yet permits free shifting of the arm with the gauge thereon along the slit 20, in the direction to bring the sheet to be registered by engagement with the stop 13 at that side of the sheet.

While I have shown the base extended forward of the stop, it is not essential, and may be even with the stop, or some distance rearward thereof, as the tympan sheet when slitted, as is here done, lifts the sheet above the bottom of the stop and closes the same.

The forward extension of my gauge is well described in the pending application herein referred to, in which I show the stop face bent up from an inner part of the base, of the strip material from which it is formed, to provide this extension.

In the present case the stop may be bent up from the end of the strip, being a very simple operation, as compared with the other method.

When using the gauge as a side gauge, or a bottom gauge, as in Fig. 5, the intermediate block 5 is omitted, clamping the base, that part 18 thereof, the full length under the tympan sheet, in the single slit 20, as clearly shown in Fig. 5, showing the side gauge, as an example in position, and at the left in this figure, the gauge is used as a bottom gauge and located in a double slit 20'—20', and both sides of the base 18—19 thus clamped.

The hold-down member 15, having an elongated slot 15' for adjustment of the narrow finger portion 15" at the front end thereof which passes through an aperture 13' in the stop face 13, formed preferably in an angular direction, for use more particularly in the side gauge. The hold-down member, best seen in Fig. 9, is elevated at the front end, before clamped down on the base, due to the narrow finger portion 15" supported higher up in the aperture 13' of the stop face, holds this front end and the front end of the wide portion thereof away from the base, before the clamping of the same to the base, and thereby providing ready entrance of the gauge under the curved ends of the slits, with both the rear and front ends of this wide portion of the hold-down member rounded, still further aiding entrance and adjustment of the gauge in the slitted runway.

From the foregoing it will be seen, I have devised a gauge, attachable to an arm, having a lateral movement imparted thereto, by means controlled by the opening and closing action of the platen, which, through the mechanism of the gripper fingers, on the closing action of the platen, moves the arm with my gauge attached, to automatically move the sheet to be printed to exact register position, and by the introduction of the intermediate member between the arm, and the gauge, adjustment of the gauge in transverse directions may be made, providing an interlocking portion 18, of the gauge adapted to enter in a novel and simple form of slit cut in the tympan sheet on which the gauge may slide, and thereby hold the arm against rocking away from the platen. The gauge as applied directly to the tympan sheet, without the intermediate member, in a single slit, for adjustment along the slit and clamped at one side of the gauge the full length thereof. When a gauge is used for automatic registering, the gripper finger at that side thereof where the side gauge is located, is generally omitted, and by means of my yielding tension member used as a substitute serving to hold the sheet in a manner to that required by the gripper finger, as well as keep the sheet from over riding away from the stop by the rapid action of the arm and gauge toward the sheet. The gauge as shown, further adapted for use, not only as a side gauge, being applicable as well for use as a bottom gauge, and clamped in two such slits, one at each side of the gauge, the front stop of narrow width to enter between the slits, adapting the gauge for use in narrow places, as stated for close rule work, the front end of the base either extended forward of the stop, flush therewith, or this front part each side of the base, as shown in Fig. 9, cut away, to enable the stop 13, to be set forward between such places, as required in close work.

It will be understood, the base of the gauge, with the stop at its front end may be formed in various ways to perform the functions herein stated, when used with or without the intermediate member 5, without departing from the scope of this invention, the base may be plain omitting the slot 10, for use without the sliding arm, as indicated in Fig. 9, and the angularly disposed aperture 13' in the stop as is particularly used in the side gauge, may be horizontal, for use in the bottom gauge.

Having described my invention I claim:

1. A gauge for use as a side gauge, adapted to be adjustably supported on an arm having a movement imparted thereto in a direction to and away from the side of the sheet to be printed, means between the base of the gauge and the arm to guide the gauge along the arm for adjustment thereof longitudinally and transversely, means to clamp the gauge in said adjusted position, and means connected with the gauge to engage in a slit cut in the tympan sheet to hold the arm and gauge in movable contact with the tympan sheet.

2. A gauge for use as a side gauge, adapted for attachment to the tympan sheet, having a single slit cut therein at right angle to the side of the sheet to be printed, for the reception thereunder and adjustable along the length of the slit, one side portion of a base member of the gauge, said base being one member of a pair of clamping members formed of flat sheet strip material said base having a stop face bent up at the front end thereof crosswise of the strip and of a width less than the width of the strip to provide a free margin at the sides of the strip, an aperture in the stop adjacent the top thereof, a stud fixed to the base extending upward and rearward of the stop, the other member of the pair of clamping members further serving as a hold-down member having a wide clamping portion provided with an elongated slot for the reception therethru of the stud on the base, and a narrow finger portion adapted to pass thru the aperture of the stop, for adjustment of the finger and the wide portion on the base, means connected with the stud to clamp the members to the tympan sheet, and means carried by the gauge to yieldingly engage the sheet to be printed to prevent shifting thereof away from the stop.

3. A gauge for use as a side gauge, adapted to be adjustably supported on an arm having a movement imparted thereto in a direction to and from the side of the sheet to be registered, means between the base portion of the gauge and the arm to guide the gauge along the arm longitudinally thereof and in a direction transversely, for adjustment of the gauge on the arm, means connected with the base to engage in a slit cut in the tympan sheet under one side of the slit to hold the arm in movable contact with the typman sheet, a stop face bent upward at the front end of the base, of a width to provide a free margin at the sides of the base, an angularly disposed aperture in the stop for the reception therethru of a narrow finger portion of a hold-down member the finger twisted to slide in the angular aperture of the stop, and a wide portion of the hold-down member, having an elongated slot for adjustment of the hold-down member on the top of the arm, and means to clamp the members in their adjusted position on the arm.

4. A gauge for use as a side gauge, adapted to be adjustably supported on an arm having a movement imparted thereto in a direction to and from the side of the sheet to be registered, means between the base portion of the gauge and the arm to guide the gauge along the arm longitudinally thereof and in a direction transversely for adjustment of the gauge on the arm, said means including a block the side walls of which engage in a recessed part lengthwise of the arm for guided movement along the arm, depending lips of the block transversely arranged to the said side walls to engage the base of the gauge for movement thereof transversely, one of said lips entering a narrow slotted runway in the base at one side thereof, so positioned to provide a margin of suitable width outside of the runway and the other lip to engage the outer edge of the base, means connected with the base to engage in a slit cut in the tympan sheet to hold the arm in close contact with the tympan and provide shifting of the arm, including an offset portion of the base of the gauge at the front end thereof, and at that side to enter under the tympan sheet in said slit, and the rearward part of the base at that side over the tympan sheet, means carried by the arm for yieldingly engaging the sheet to be registered from riding away from the stop during the shifting of the arm.

5. A gauge for use in registering sheets to be printed, adapted to co-operate with a pair of parallel slits cut in the tympan sheet, in a direction transverse to the edge of the sheet to be registered, with one end of the slits extending under the sheet to be printed, and the other ends of the slits cut outwardly in opposite directions to provide an entrance under the slits, of a gauge comprising a flat base member, having a narrow extended front portion central of the base the end of which bent upward to form a stop face, the width of which is less than the distance between said slits to provide a margin of the base at each side thereof adapted to enter under the outwardly cut portions of the slits, and take a position under the tympan sheet, an aperture in the stop face, a threaded stud fixed to the base, said base forming one member of a pair of clamping members, and a hold-down member, forming the other of said clamping members, having a narrow finger portion adapted to enter the aperture of the stop face and slidable therein, said finger preferably of wire attached to the front end of the hold-down member, the front end of which is bent upward from a part rearward thereof that engages the sheet yieldingly to be printed, to prevent shifting away from the stop, and act as a hold-down finger against lifting of the sheet, and a slotted wide portion thereof through which the threaded stud extends, to receive a clamping nut to draw the members, the base marginal portions, under the tympan sheet, and the hold-down member, on top of the sheet, after adjustment thereof along the slits, into clamped relation.

6. A gauge for use in registering sheets to be printed, co-operative with a single slit cut in the tympan sheet, in a direction transverse to the edge of the sheet, to be registered, with one end of the slit extending under the sheet, the slit of suitable length to permit entrance from one side of the slit, for a gauge comprising a flat base member, having a front portion bent upward to form a stop face of a width to provide a margin of the base, at each side thereof, one of which adapted to enter from one side of the slit and take a position under the tympan sheet, an aperture in the stop face, a threaded stud fixed to the base, said base forming one member of a pair of clamping members, a hold-down member, being the other of said clamping members, having a narrow finger portion adapted to enter the aperture of the stop and slidable therein, and a slotted wider portion thereof through which the threaded stud extends, for adjustment of this member on the base, and receive on the end of the stud a clamping nut to draw the members, at that side with the base under the tympan sheet, into clamped relation, after adjustment of the gauge along the slit, and means carried by the hold-down member to yieldingly engage the sheet to be printed, to prevent shifting thereof from the stop.

7. A printer's gauge, comprising a pair of clamping members, formed of flat strip material, one of which forms the base of the gauge, having a stop face of narrow width, bent upward at the front end thereof, and central of the strip, to enable the wider portion of the base, at each side thereof to enter under the tympan sheet, between two slits cut in the tympan, an aperture in the stop face, an upstanding threaded stud fixed to the base, a hold-down member, forming the other of said clamping members, having a narrow finger portion, adapted to enter and slidable in the aperture of the stop, and support at an elevated position from the base, the forward end of a wide and slotted portion of the hold-down member, which slotted part straddles the stud, and provides a sliding and guiding action of this member on the base, adapting the gauge for ready entrance, in the slits, with the base under the tympan, and the hold-down member in its elevated position to freely enter the gauge in, and for adjustment along the slits, and means to draw the members into tight relation to clamp the gauge in its adjusted position.

8. A printer's gauge of the class specified, comprising a flat base member, having a stop face bent up at its front end, an aperture in the stop adjacent the top thereof, said aperture in the form of an elongated slot disposed in an angular relation to the base, an upstanding stud, fixed to the base, a hold-down member, having a narrow finger portion adapted to slide in the aperture, and a wide and slotted portion to straddle the stud and ride on the base for longitudinal adjustment of the finger and said wide portion relative to the base, said narrow finger portion having a twist adjacent the wide portion to correspond to the angular aperture, substantially as specified.

HERBERT F. JOHNSON.